(12) United States Patent
Yin

(10) Patent No.: US 9,334,615 B2
(45) Date of Patent: May 10, 2016

(54) ROAD DEICER AND DEICING SYSTEM

(71) Applicant: Wuji Yin, Changsha (CN)

(72) Inventor: Wuji Yin, Changsha (CN)

( * ) Notice: Subject to any disclaimer, the term of this patent is extended or adjusted under 35 U.S.C. 154(b) by 0 days.

(21) Appl. No.: 14/373,224

(22) PCT Filed: Oct. 22, 2013

(86) PCT No.: PCT/CN2013/085680
§ 371 (c)(1),
(2) Date: Jul. 18, 2014

(87) PCT Pub. No.: WO2014/139288
PCT Pub. Date: Sep. 18, 2014

(65) Prior Publication Data
US 2015/0075037 A1 Mar. 19, 2015

(30) Foreign Application Priority Data
Mar. 14, 2013 (CN) ...................... 2013 2 0115797 U

(51) Int. Cl.
*E01H 5/00* (2006.01)
*E01H 5/10* (2006.01)
*E01C 11/26* (2006.01)
*H05B 6/64* (2006.01)
*H05B 6/70* (2006.01)
*H05B 6/72* (2006.01)

(52) U.S. Cl.
CPC ................ *E01H 5/102* (2013.01); *E01C 11/26* (2013.01); *E01H 5/10* (2013.01); *H05B 6/6452* (2013.01); *H05B 6/707* (2013.01); *H05B 6/708* (2013.01); *H05B 6/72* (2013.01); *H05B 2214/02* (2013.01)

(58) Field of Classification Search
CPC ...... B64D 15/00; B64D 15/14; B64F 5/0054; B64F 5/0063; E01C 7/32; E01C 7/35; E01C 11/245; E01C 11/26; E01H 5/10; E01H 5/12; E01H 13/00; E01H 5/102; H05B 6/60; H05B 2214/02; H05B 6/72; H05B 6/6452; H05B 6/707; H05B 6/708
USPC ............ 37/197, 227; 219/201, 679, 687, 703, 219/759; 404/75, 79; 126/271.1
See application file for complete search history.

(56) References Cited

U.S. PATENT DOCUMENTS 4,060,212 A * 11/1977 Magenheim ........... B64D 15/00
                                                                 219/679
4,365,131 A * 12/1982 Hansman, Jr. ......... B64D 15/14
                                                                 219/703

(Continued)

FOREIGN PATENT DOCUMENTS

| CN | 2543989 Y | 4/2003 |
| CN | 1329588 C | 8/2007 |
| CN | 201924317 U | 8/2011 |

(Continued)

OTHER PUBLICATIONS

Int'l Search Report for PCT/CN2013/085680, nine pages, mailed Jan. 30, 2014.

*Primary Examiner* — Robert Pezzuto
(74) *Attorney, Agent, or Firm* — Nixon & Vanderhye PC

(57) ABSTRACT

I describe a road deicer, comprising a magnetron connected to a power supply device through a power transformer, an antenna chamber connected to the magnetron through a waveguide tube, and a microwave emitter arranged inside the antenna chamber, wherein at least one slot is formed on an emitting end of the antenna chamber facing the road. The deicer generates microwave energy through a magnetron, transmits the microwave energy through a waveguide tube, and then radiates the microwave energy through a microwave emitter and slots, thereby melting the ice through microwave heating. The road deicer has higher deicing efficiency, and it won't damage the road, nor pollute the environment. It also provides a road deicing system which has high deicing efficiency and can avoid damaging the road and polluting the environment.

10 Claims, 2 Drawing Sheets

(56) References Cited

U.S. PATENT DOCUMENTS 4,571,860 A * 2/1986 Long .................. E01C 7/32
219/201
5,134,266 A * 7/1992 Peppard ................ B64F 5/0054
126/271.1

FOREIGN PATENT DOCUMENTS

| | | |
|---|---|---|
| CN | 203128975 U | 8/2013 |
| JP | 11-280037 | 10/1999 |
| WO | 83/01798 | 5/1983 |
| WO | 96/10115 | 4/1996 |

* cited by examiner

ROAD DEICER AND DEICING SYSTEM

This application is the U.S. national phase of International Application No. PCT/CN2013/085680 filed 22 Oct. 2013, which designated the U.S. and claims priority to Chinese Application No. 201320115797.0 filed 14 Mar. 2013; the entire contents of each of which are hereby incorporated by reference.

TECHNICAL FIELD

The present disclosure relates to a road deicer and a deicing system.

TECHNICAL BACKGROUND

Icing phenomenon often occurs to bridges and roads in winter, which affects traffic flow and even influences traffic safety when severe enough. Therefore, deicing of the road is constantly required in winter.

Currently, the following deicing methods are commonly used:

1. Deicing by labor, including shoveling and spreading industrial salt. The above two methods are time consuming and laborsome, not to mention being less efficient. Moreover, spreading industrial salt not only damages the road surface and structural metal elements associated therewith, but also causes environmental pollution.

2. Mechanical deicing, including mechanical shoveling deicing and mechanical heating deicing. The mechanical shoveling deicing, which usually uses drum-type deicer, suffers from poor deicing performance, low deicing efficiency as well as serious damage to the road surface; while mechanical heating deicing, which usually uses heater vehicle to melt the ice on the road, has the defects of low deicing efficiency and high energy consumption due to repetitive operation.

In conclusion, the existing deicing methods and equipment are disadvantageous in low efficiency.

SUMMARY OF THE INVENTION

To overcome the above defects, the present disclosure provides a road deicer which can effectively improve the road deicing efficiency.

The present disclosure aims to provide a road deicing system which can effectively improve the road deicing efficiency.

The present disclosure provides a road deicer, comprising:
 a magnetron connected to a power supply device through a power transformer,
 an antenna chamber connected to said magnetron through a waveguide tube, and
 a microwave emitter arranged inside said antenna chamber, wherein at least one slot is formed on an emitting end of the antenna chamber facing the road.

Optionally, said microwave emitter comprises a cylindrical parabolic antenna which can focus the microwave energy from the microwave emitter on the road and a turnstile antenna.

Optionally, a plurality of slots is evenly distributed on the emitting end.

Optionally, the length of the slot is half of the wave length of the microwave.

Optionally, one side of the emitting end adjacent to the road is provided with an antifouling ceramic plate.

Optionally, the operation frequency of the magnetron is 915±13 MHz or 2450±50 MHz.

The present disclosure provides a road deicing system, comprising:
 a controlling device,
 at least one deicer according to any one of the deicers as mentioned above connected to said controlling device and arranged on the road surface, and
 a power supply device electrically connected to both the controlling device and the deicer.

Optionally, the controlling device comprises a central processing unit and at least one temperature sensor connected to the central processing unit.

Optionally, a plurality of deicers is evenly arranged on one side of the road or on both sides thereof, said road deicers being parallel with the road surface.

Optionally, the temperature sensor is arranged inside the concrete or asphalt layer of the road.

The deicer of the present disclosure generates microwave energy through a magnetron, transmits the microwave energy through a waveguide tube, and then radiates the microwave energy through a microwave emitter and slots, thereby melting the ice through microwave heating. Therefore, as compared with the prior art, the road deicer of the present disclosure has higher deicing efficiency, and it does not damage the road, nor pollute the environment.

In a technical solution, the microwave emitter uses a cylindrical parabolic antenna and a turnstile antenna. The microwave can focus the microwave energy on the road surface under the directing effect of the cylindrical parabolic antenna, thereby improving the utilization rate of the microwave energy and the deicing efficiency.

In another technical solution, a plurality of slots is evenly distributed on the emitting end. These slots can guarantee that the microwave energy can be uniformly radiated onto the road surface, thereby improving the utilization rate of the microwave energy and the deicing efficiency.

In a further technical solution, the length of the slot is half of the wave length of the microwave, with which the microwave can be effectively radiated onto the road.

In another technical solution, an antifouling ceramic plate is arranged so that dust and fouling prevention can be realized without affecting the transmission of microwave.

In another technical solution, the operation frequency of the magnetron can be set as 915±13 MHz or 2450±50 MHz, which can guarantee the deicing performance without harming the passersby by the microwave.

The road deicing system according to the present disclosure can generate microwave energy through a magnetron, transmit the microwave energy through a waveguide tube, and then radiate the microwave energy through a microwave emitter and slots thereon, thereby realizing deicing through microwave heating. Therefore, as compared with the prior art, the deicing system of the present disclosure can not only deice the road with high efficiency, but also avoid damaging the road and polluting the environment.

In a further technical solution, a controlling device, to be specific a temperature sensor and a central processing unit, is arranged to control the road deicers, so as to improve automation and ease of use of the deicers.

In another technical solution, the road deicers, which are parallel with the road surface, are arranged at one side or both sides of the road. The road deicers arranged in this way can not only avoid impacting the traffic, but also guarantee the deicing performance and improve the deicing efficiency.

In another technical solution, the temperature sensors, which are arranged under the road surface, conduct real time monitoring of the road without blocking the traffic flow.

The above technical features can be combined in any suitable manners or substituted with other equivalent technical features as long as they can help reaching the goal of the present disclosure.

BRIEF DESCRIPTION OF THE DRAWINGS

The present disclosure will be described in detail on the basis of the following non-definitive embodiments in combination with the accompany drawings, wherein.

DETAILED DESCRIPTION OF THE EMBODIMENTS

To further clarify the objectives and advantages of the present disclosure, the technical solutions will be fully and clearly described below based on the embodiments of the present disclosure. In the meantime, any other embodiments conceivable by the person skilled in the art without involvement of creative work also fall within the scope of the present disclosure.

Embodiment 1

Figure 1:
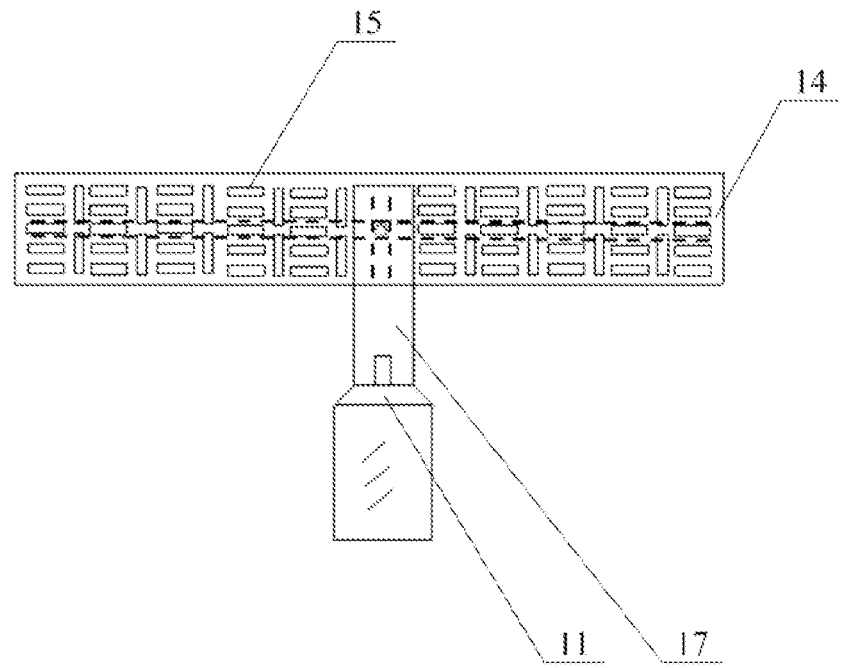
FIG. 1 is a front view of the road deicer according to Example 1 of the present disclosure.
Figure 2:
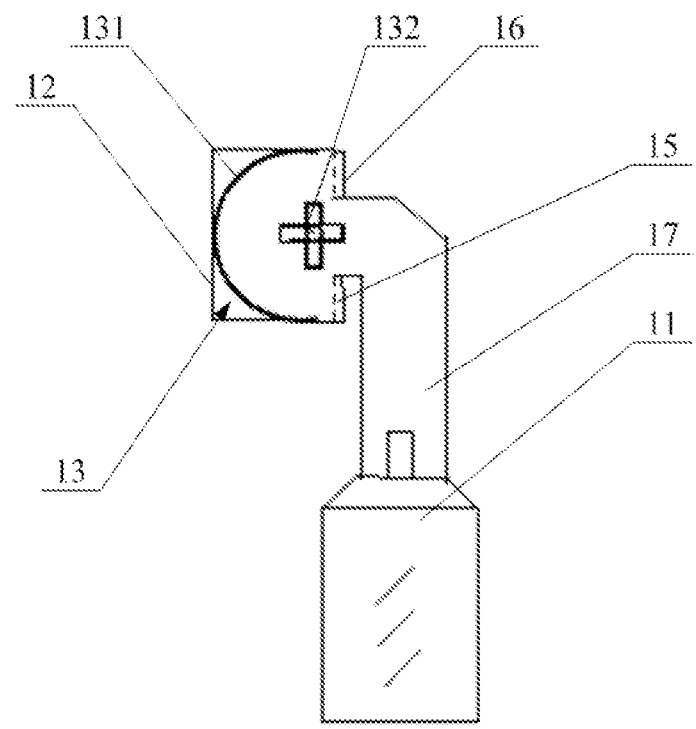
FIG. 2 is a side view of the road deicer according to Example 1 of the present disclosure.

As shown in FIG. 1 and FIG. 2, the road deicer of the present disclosure comprises a magnetron 11 connected to a power supply through a power transformer, an antenna chamber 12 connected to the magnetron 11 through a waveguide tube 17, and a microwave emitter 13 arranged in the antenna chamber 12, wherein at least one slot 15 is formed on an emitting end 14 of the antenna chamber 12 facing the road.

The road deicer according to the present disclosure can generate microwave energy through the magnetron 11, transmit the microwave energy through the waveguide tube 17, and then radiate the microwave energy through the microwave emitter 13 and slots 15 thereon, thereby realizing deicing through microwave heating. The deicer of the present disclosure can not only deice the road with high efficiency, but also avoid damaging the road and polluting the environment.

In embodiment 1, in order to make sure that the microwave energy can be radiated onto the road in specific direction so as to maximize the deicing performance, the microwave emitter 13 is provided with a cylindrical parabolic antenna 131 which can focus the microwave energy on the road surface and a turnstile antenna 132. Under the directing effect of the cylindrical parabolic antenna 131 as well as the slots 15, the microwave can radiate the microwave energy onto the road surface, so that the utilization rate of the microwave energy can be increased and the deicing efficiency can be improved.

In embodiment 1, as shown in FIG. 1, a plurality of slots 15 is evenly distributed on the emitting end 14. Evenly distributing a plurality of slots 15 can ensure that the microwave energy is uniformly radiated onto the road surface, thereby increasing the utilization rate of the microwave energy and improving the deicing efficiency.

In embodiment 1, the length of the slot 15 is half of the wave length of the microwave, with which the microwave can be effectively radiated onto the road surface.

In embodiment 1, because the road deicers are arranged on the road surface, they are subjected to the natural environment to a considerable extent. In order to guarantee that the microwave emitter 13 functions properly, an anti-fouling ceramic plate 16 can be arranged on one side of the emitting end 14 adjacent to the road. The anti-fouling ceramic plate 16 has the effects of dust proofing and fouling prevention, and since it is insulating material, it usually absorbs small microwave power. Therefore, most of the microwave penetrates the ceramic plate, thus the transmission and radiation of the microwave can be left unaffected.

In embodiment 1, the operation frequency of the magnetron 11 is 915±13 MHz or 2450±50 MHz. Preferably, a 3 KW industrial magnetron or a 0.5 KW civil magnetron is selected as the magnetron 11. Both types of magnetron are advantageous in low price and high reliability. In the meantime, the lower power magnetron 11 of both frequencies can emit microwave, which does not penetrate human body and damage internal organs, directionally to the road surface, and thus avoiding harming human health. Using such magnetron can also avoid obstructing the normal traffic flow.

It is important to note that according to theory and experiments, the strength of microwave acceptable to human body is 100 mw/cm$^2$. The safety standard regulation of western European countries is one tenth of the abovementioned microwave strength, i.e., 10 mw/cm$^2$, and the health standard (GB10436-89) for microwave strength in workplaces in China is 50 μW/cm$^2$. The most common microwave in the embodiment 1 has a strength of 5~30 μW/cm$^2$ which is the theoretical value for increasing the temperature of the concrete layer or asphalt layer on bridges or roads from 15° C. below zero to 5° C. By selecting low power, universal type magnetron 11, embodiment 1 can realize the objectives of low investment, low radiation, energy conservation, and harmlessness.

Embodiment 2

Figure 3:
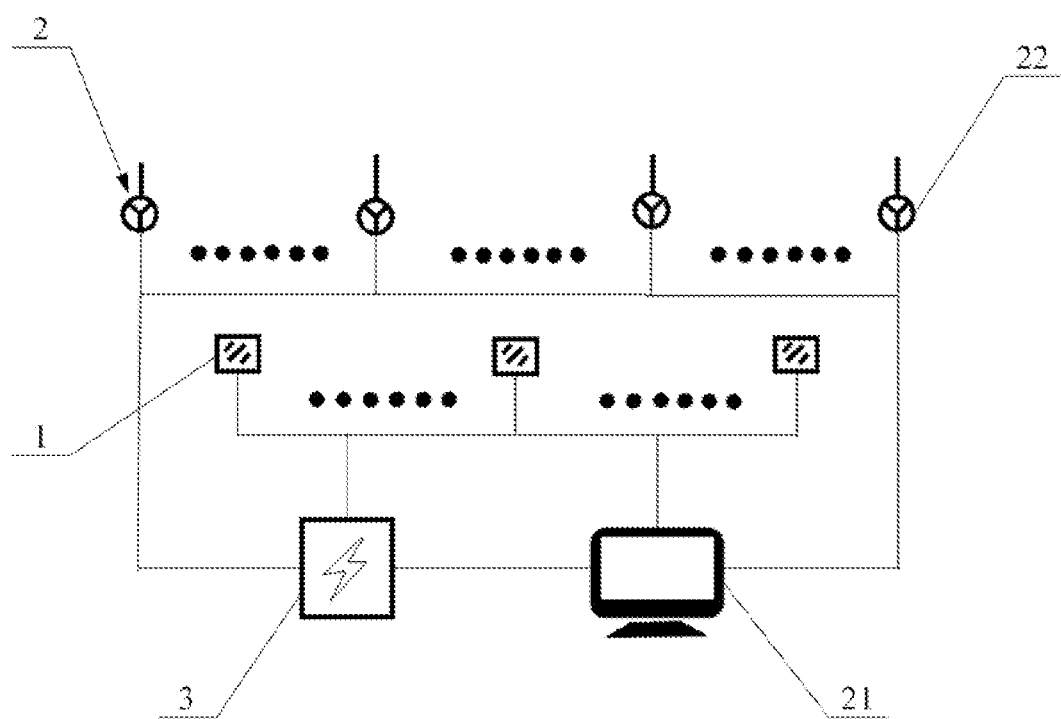
FIG. 3 schematically shows a road deicing system according to Example 2 of the present disclosure.

As shown in FIG. 3, the road deicing system according to the present disclosure comprises a controlling device 2, at least one deicer according to Example 1 which is connected to the controlling device 2 and arranged on the road surface, and a power supply 3 electrically connected to both the controlling device 2 and the deicer.

The deicing system activates the road deicer through the controlling device 2, generates microwave energy through the magnetron, and then transmits the microwave energy through the waveguide tube 17, and finally radiates the microwave energy through the microwave emitter and the slots thereon, thus realizing deicing through microwave heating. The deicing system according to the present disclosure has high deicing efficiency; in the meantime, it does not damage the road nor pollute the environment.

In embodiment 2, the controlling device 2 can be operated manually, which, however, can increase labor cost. Therefore, automatic controlling device is also an option. Specifically, the controlling device 2 comprises a central processing unit 21 and at least one temperature sensor 22 connected to said central processing unit 21. The temperature sensor 22 collects real time data of the road surface temperature, and sends the data to the central processing unit 21. When the temperature of certain area of the road drops below zero or the freezing point, the central processing unit 21 automatically starts the deicer at the corresponding area which emits microwave for heating up the road surface. When the temperature of the road surface is higher than a predetermined temperature (for example 5° C.), the central processing unit automatically stops the microwave emission. The central processing unit 21 can also be remotely controlled by a computer, thereby effectively improving the automation of the road deicing system and facilitating the usage thereof.

In embodiment 2, in order to guarantee a maximum deicing performance, a plurality of road deicers can be arranged on one side or both sides of the road, the road deicers being in parallel with the road surface.

Furthermore, when the road deicers are arranged on both sides of the road, deicers on each side can be arranged in alignment with deicers at the other side of the road, or alternately relative to the deicers at the other side of the road.

In embodiment 2, in order to guarantee the reliability of the temperature data collected by the temperature sensor 22 under the condition that the road has already been iced up when the data is being collected, the sensor 22 can be arranged inside the concrete layer or asphalt layer of the road.

In order to verify the deicing performance of the road deicer and the deicing system, the inventor conducted the following experiments:

Experiment Example 1

In a county in the South of China, the temperature in winter can be as low as 7° C. below zero. A 209-meter long and 6-meter wide concrete bridge located at a wind gap suffers from severe icing on its surface, which causes huge inconvenience for vehicles and the passersby. A road deicing system having 10 road deicers, 20 temperature sensors, and a central processing unit was provided. The road deicer adopted a 500 W magnetron which is commonly used in domestic microwave oven and has a microwave heating frequency of 2450±50 MHZ. The entire deicing system was powered up by a 220V mains supply. The 10 road deicers were alternately fixed to the guardrails on both sides of the bridge at intervals of around 20 meters, with 5 road deicers on each side. The antenna chamber of each road deicer was arranged at the shoulder of the bridge. Slits were provided on the concrete layer of the bridge at intervals of about 10 meters for embedding the 20 temperature sensors therein. The temperature sensors and the road deicers were electrically connected with the central processing unit; and the temperature sensors, the road deicers, and the central processing unit were all electrically connected with the power supply. The parameters set by the central processing unit included: the road deicer automatically starts and emits microwave when the temperature of the concrete on the bridge is lower than 0° C., and the road deicer automatically cuts out the power for the microwave when the temperature is higher than 5° C. During a 3-month ice period, no icing phenomenon that endangers the traffic and the passersby occurs; and snow cover can only be observed when snowing very heavily, but the snow melts really soon afterwards.

Experiment Example 2

A county in Northern China, the temperature in winter can be as low as 21° C. below zero. A 310-meter long and 12-meter wide concrete bridge, the surface of which is paved with asphalt layer, was provided with a road deicing system comprising 10 road deicers, 20 temperature sensors, and a computer programmed central processing unit. The road deicing system adopted a 3000 W industrial magnetron having an operation frequency of 915±13 MHZ. The deicing system was powered up by a 380V power supply. The 10 road deicers were alternately fixed to the guardrails on both sides of the bridge at intervals of around 30 meters, with 5 road deicers on each side. The microwave antenna chamber of each road deicer was arranged at the shoulder of the bridge. Slits were provided on the asphalt layer of the bridge at intervals of about 15 meters for embedding the 20 temperature sensors therein. The temperature sensors and the road deicers were electrically connected with the central processing unit; and the temperature sensors, the road deicers, and the central processing unit were all electrically connected with the power supply. The parameters set by the central processing unit included: the road deicer automatically starts and emits microwave when the temperature of the asphalt layer on the bridge is lower than 0° C., and the road deicer automatically cuts out the power for the microwave when the temperature is higher than 5° C. During a 3-month ice period, no obvious icing phenomenon occurs on the bridge.

Experiment Example 3

In a mountainous area, the temperature in winter can be as low as 10° C. below zero. A 1269-meter long and 15-meter wide concrete main road suffers from severe icing which causes great inconvenience for vehicles and the passersby. A road deicing system comprising 30 small size road deicers, 60 temperature sensors, and a central processing unit was provided. The deicing system adopted a 3000 W industrial magnetron having a microwave heating frequency of 915±13 MHZ. The deicing system was powered up by a 380V power supply. The 30 road deicers were alternately fixed on both sides of the main road at intervals of around 40 meters, with 15 road deicers on each side. The antenna chamber of each road deicer was arranged at the shoulder of the road. Slits were provided at the edge of the concrete layer of the road at intervals of about 20 meters for embedding the 60 temperature sensors therein. The temperature sensors and the road deicers were electrically connected with the central processing unit; and the temperature sensors, road deicers, and the central processing unit were all electrically connected to the power supply. The parameters set by the central processing unit included: the road deicer automatically starts and emits microwave when the temperature of the concrete on the road surface is lower than 0° C., and the road deicer automatically cuts out the power for the microwave when the temperature is higher than 3° C. During a 2-month ice period, no icing phenomenon that endangers the traffic and the passersby occurs; and snow cover can only be observed when snowing very heavily, but the snow melts really soon afterwards.

Experiment Example 4

In a mountainous area, the temperature in winter can be as low as 27° C. below zero. A 286-meter long and 12-meter wide steel construction bridge, which is paved with asphalt layer on the surface thereof, was provided with a road deicing system comprising 10 road deicers, 20 temperature sensors, and a computer programmed central processing unit. The deicing system adopted a 3000 W industrial magnetron having an operation frequency of 915±13 MHZ. The deicing system was powered up by a 380V power supply. The 10 road deicers were alternately fixed to the guardrails on both sides of the bridge at intervals of 30 meters, with 5 deicers on each side thereof. The microwave antenna chamber of each road deicer was fixed to the edge of the guardrail. Slits were provided on the asphalt layer of the bridge at intervals of 15 meters for embedding the 20 temperature sensors therein. The temperature sensors and the road deicers were electrically connected to the central processing unit; and the temperature sensors, road deicers, and the central processing unit were electrically connected to the power supply device. The parameters set by the central processing unit included: the road deicer automatically starts and emits microwave when the temperature of the asphalt layer is lower than 0° C., and the road deicer automatically cuts out the power for the microwave when the temperature is higher than 3° C. During a 3-month ice period, no obvious icing phenomenon that endangers the traffic safety occurs.

Experiment Example 5

In a mountainous area, the temperature in winter can be as low as 17° C. below zero. A 330-meter long and 12-meter wide concrete bridge, which is paved with asphalt layer on the surface thereof, was provided with a road deicing system comprising 11 road deicers, 22 temperature sensors, and a computer programmed central processing unit. The deicing system adopted a 3000 W industrial magnetron having an operation frequency of 915±13 MHZ. The deicing system was powered up by a 380V power supply. The 11 road deicers were alternately fixed to the guardrails on both sides of the bridge at intervals of 30 meters, with 5 deicers on one side of the bridge and 6 on the other side thereof. The microwave antenna chamber of each road deicer was fixed to the edge of the guardrail. Slits were provided on the asphalt layer of the bridge at intervals of 15 meters for embedding the 22 temperature sensors. The temperature sensors and the road deicers were electrically connected to the central processing unit; and the temperature sensors, road deicers, and the central processing unit were electrically connected to the power supply. The parameters set by the central processing unit included: the road deicer automatically starts and emits microwave when the temperature of the asphalt layer is lower than 0° C., and the road deicer automatically cuts out the power for the microwave when the temperature is higher than 3° C. During a 3-month ice period, no obvious icing phenomenon that endangers the traffic safety occurs.

It should be noted that the above examples are only explanations of the technical solutions of the present disclosure instead of limitations thereto. Although the present disclosure has been described with reference to preferred embodiments, one skilled in the art should understand that modifications can be made to the technical solutions as recited in the above examples and part of the technical features can be substituted with equivalents. These modifications or substitutions do not cause the corresponding technical solutions to depart from the scope of the present disclosure.

LIST OF REFERENCE SIGNS 1 road deicer
11 magnetron
12 antenna chamber
13 microwave emitter
131 cylindrical parabolic antenna
132 turnstile antenna
14 emitting end
15 slot
16 antifouling ceramic plate
17 waveguide tube
2 controlling device
21 central processing unit
22 temperature sensor
3 power supply

The invention claimed is:

1. A road deicer, comprising:
   a magnetron connected to a power supply through a power transformer,
   an antenna chamber connected to said magnetron through a waveguide tube, and
   a microwave emitter arranged inside said antenna chamber;
   wherein at least one slot is formed on an emitting end of the antenna chamber facing the road, and the road deicer is arranged on a road surface and configured such that the magnetron generates microwave energy which is transmitted through the waveguide tube and radiated through the microwave emitter and the at least one slot to the road surface to realize deicing through microwave heating.

2. The deicer according to claim 1, wherein said microwave emitter comprises a cylindrical parabolic antenna, which can focus the microwave energy from the microwave emitter on the road, and a turnstile antenna.

3. The deicer according to claim 1, wherein a plurality of slots is evenly distributed on the emitting end.

4. The deicer according to claim 1, wherein the length of the slot is half of the wave length of the microwave energy emitted from the microwave emitter.

5. The deicer according to claim 1, wherein one side of the emitting end adjacent to the road is provided with antifouling ceramic plate.

6. The deicer according to claim 1, wherein the operation frequency of the magnetron is 915±13 MHz or 2450±50 MHz.

7. A road surface deicing system, comprising:
   a controlling device and
   at least one deicer according to claim 1 connected to said controlling device and arranged on the road surface; and
   wherein the controlling device is electrically connected to the power supply of the deicer.

8. The deicing system according to claim 7, wherein the controlling device comprises a central processing unit and at least one temperature sensor connected to the central processing unit.

9. The deicing system according to claim 7, wherein a plurality of deicers is evenly arranged on one side of the road or on both sides thereof.

10. The deicing system according to claim 8, wherein the temperature sensor is arranged inside the concrete or asphalt layer of the road.

* * * * *